Dec. 5, 1933.      R. PORCELLO      1,938,498
WHEEL SPRING DEVICE
Filed Sept. 2, 1932
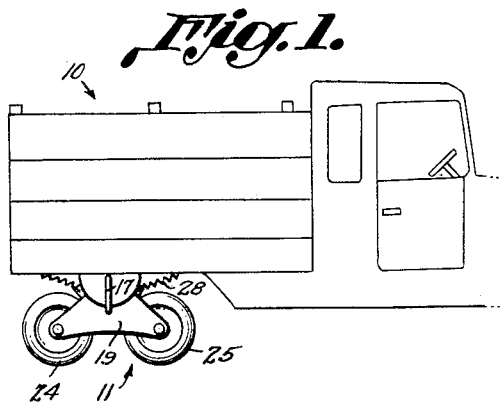
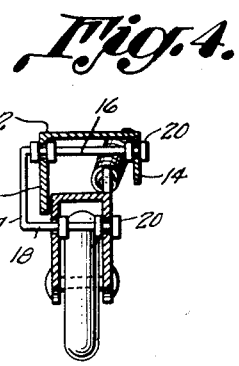
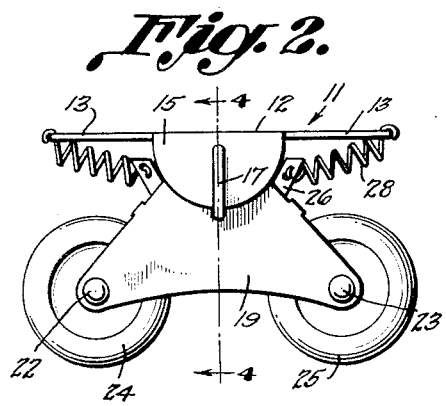
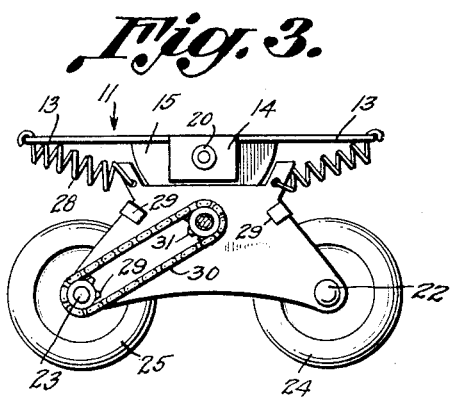
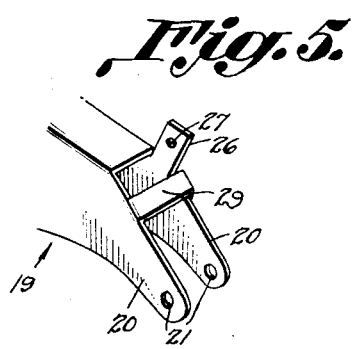
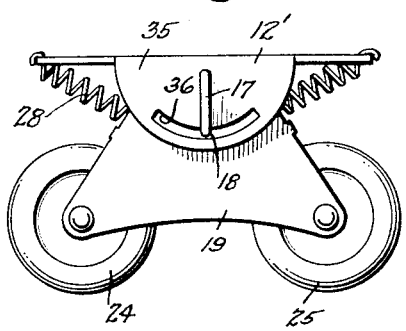
Inventor
Raphael Porcello
By Miller + Miller
Attorneys Patented Dec. 5, 1933

1,938,498

UNITED STATES PATENT OFFICE 1,938,498

WHEEL SPRING DEVICE

Raphael Porcello, Richmond Hill, N. Y.

Application September 2, 1932. Serial No. 631,558

4 Claims. (Cl. 280—124)

This invention relates to an automobile wheel spring device and has for an object to provide an improved wheel spring device for use on automobiles, trucks, or other vehicles using wheels.

A further object of this invention is to provide an improved means of substituting a pair of wheels for the single wheel ordinarily used, which improved means will include a spring or yieldable connection between the mount for the pair of wheels and the vehicle chassis.

Yet a further object of this invention is to provide an improved spring wheel device which will make for easier riding characteristics of the vehicle.

Yet an additional object of this invention is to provide a yieldable means of mounting a pair of wheels on a vehicle whereby the wheels may more easily climb over an obstruction without transmitting the full shock caused by the obstruction to the vehicle.

With the foregoing and other objects in view, as will hereinafter become apparent, this invention comprises the constructions, combinations and arrangements of parts hereinafter set forth, disclosed and shown on the accompanying drawing. In this drawing, Figure 1 shows the spring wheels applied to the rear wheels of an automobile or truck, Figure 2 is an enlarged front elevation of the spring wheels, Figure 3 is a rear view of the same, Figure 4 is a sectional view taken on line 4—4 of Figure 2, showing shape and position of wheel axle, Figure 5 is a perspective view of a portion of the wheel support showing lug for receiving spring and supporting brace, and Figure 6 is a modification, showing axle riding in a slat in top member.

There is shown at 10 a conventional fragmentary representation of an automobile truck or vehicle to which the spring wheel device 11 constituting this invention has been applied. The spring wheel device 11 includes a top member or mount 12 which is mounted on the automobile truck 10 either directly to the chassis of the vehicle or to the supporting spring ordinarily used with a single wheel.

This mount 12 has two longitudinally extending arms 13 and at its center has two depending flanges 14 and 15 which may be shaped as shown, the flange 14 being substantially square in outline while the flange 15 is substantially semi-circular in outline. Journaled through the flanges 14 and 15 is one leg 16 of a U-shaped axle 17, the other leg 18 being journaled in the wheel support 19, suitable means 20 being provided for retaining the U-shaped axle 17 in the mount 12 and the wheel support 19.

The wheel support 19 is substantially U-shaped in cross section and has a pair of forwardly and a pair of rearwardly projecting legs 20. A pair of aligned apertures 21 in each of the legs 20 provide a means for journaling the axles 22 and 23 of the wheels 24 and 25 therein. A flange projecting from the top of one leg 20 of each pair provides a lug 26 which is apertured as at 27 to receive one end of a spring 28. The other end of the spring 28 is secured in an appropriate aperture in the end of the arm 13 of the mount 12. Another flange projecting from the other leg 20 of each pair is folded over the first leg of each pair, to form a strengthening bridge or brace 29.

The wheel 25 will preferably be the power receiving wheel for propelling the vehicle 10. Secured on the axle 23 of the wheel 25 is a sprocket 29 operated by a sprocket chain 30, which in turn is mounted on a sprocket 31 concentric with the axle leg 18 about which the support 19 may pivot, the sprocket 31 being operated by suitable gearing and differentials from the power plant of the vehicle. Obviously, a train of gears may be substituted between the sprockets 29 and 31 instead of the chain 30 if desired.

In operation, the wheels 24 and 25 travel over a smooth surface in the same manner that a single wheel would do so. When an obstruction is struck, however, instead of lifting the vehicle 10 directly up the height of the obstruction, the power wheel 25 climbs over the obstruction compressing and extending the two springs 28 as it does so, and pivoting the mount 19 about the leg 18 of the axle 17 at the same time that the axle 17 pivots about its leg 16 in the support 12. If the obstruction encountered is not very high or wide the wheel 25 may be over it before the wheel 24 starts to mount it. In this case, the level of the vehicle will hardly have been changed by the obstruction, for first one wheel 25 and then the second wheel 24 will ride over the obstruction, shifting about the axle 17 as it does so, allowing the wheels to pass over the obstruction and to transmit a minimum amount of shock to the vehicle, much less than is customary with a single wheel.

In the form shown in Figure 6, the flange 35 of the mount 12' has a slot 36 for the leg 18 of the U-shaped axle 17 to operate through, the remaining element and the operation of this form being otherwise identical with the form previously described.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

1. A wheel spring device comprising a mount, a wheel support, means on said wheel support for securing a pair of wheels in tandem therein, a pair of depending flanges on said mount, a U-shaped axle pivotally journaled through said support and through said mount, and means for yieldably holding said wheel support against pivotal movement relative to said mount.

2. A wheel spring device comprising a mount, a wheel support, means on said wheel support for securing a pair of wheels in tandem therein, a pair of depending flanges on said mount, a U-shaped axle pivotally journaled through said support and through said mount, and means for yieldably holding said wheel support against pivotal movement relative to said mount, said means comprising a pair of springs, each of said springs being secured to one end of said mount and to said wheel support.

3. A wheel spring device comprising a mount, a wheel support, means on said wheel support for securing a pair of wheels in tandem therein, a pair of depending flanges on said mount, a U-shaped axle pivotally journaled through said support and through said mount, and means for yieldably holding said wheel support against pivotal movement relative to said mount, said means comprising a pair of springs, each of said springs being secured to one end of said mount and to said wheel support, a lug on said wheel support on each side of the U-shaped axle providing a securing means for the spring on the same side of the U-shaped axle.

4. A wheel spring device comprising a mount adapted to be secured to a vehicle, a wheel support, said wheel support being U-shaped in cross section, a pair of forwardly extending legs and a pair of rearwardly extending legs on said wheel support, each pair of legs providing means for mounting a wheel thereon whereby said pair of wheels are in tandem, a pair of depending flanges on said mount, a U-shaped axle journaled through said flanges and through said wheel support, a pair of springs, each spring being secured on opposite sides of said U-shaped axle to said mount and to said wheel support, yieldably permitting said wheel support to pivot in said U-shaped axle and said mount.

RAPHAEL PORCELLO.